US008223381B2

(12) United States Patent
Ohta (10) Patent No.: US 8,223,381 B2
(45) Date of Patent: Jul. 17, 2012

(54) ELECTRONIC DEVICE (75) Inventor: Shingo Ohta, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1397 days.

(21) Appl. No.: 11/826,954

(22) Filed: Jul. 19, 2007

(65) Prior Publication Data
US 2008/0021862 A1      Jan. 24, 2008

(30) Foreign Application Priority Data

Jul. 21, 2006   (JP) ................................ 2006-199763

(51) Int. Cl.
G06K 15/00 (2006.01)
G06K 1/00 (2006.01)
G06K 9/46 (2006.01)
G06K 9/36 (2006.01)
G06F 15/00 (2006.01)
G06F 3/12 (2006.01)

(52) U.S. Cl. ...... 358/1.16; 358/1.5; 358/1.12; 358/1.15; 358/1.17; 358/1.18; 382/232; 382/233; 382/240

(58) Field of Classification Search ........ 358/1.11–1.18; 382/100, 233; 400/76
See application file for complete search history.

(56) References Cited

U.S. PATENT DOCUMENTS

| | | | | |
|---|---|---|---|---|
| 6,157,389 A * | 12/2000 | Knowlton | ..................... | 345/660 |
| 6,934,052 B2 * | 8/2005 | Venable | ....................... | 358/1.18 |
| 7,113,612 B2 * | 9/2006 | Sugahara et al. | ............. | 382/100 |
| 7,200,272 B2 * | 4/2007 | Ishikawa | ....................... | 382/233 |
| 7,228,323 B2 * | 6/2007 | Angerer et al. | ............... | 708/203 |
| 7,733,516 B2 * | 6/2010 | Asano et al. | .................. | 358/1.16 |
| 7,936,467 B2 * | 5/2011 | Shimizu | ....................... | 358/1.15 |
| 2004/0012812 A1 | 1/2004 | Shimizu | | |
| 2004/0240919 A1 * | 12/2004 | Hisatomi | ........................ | 400/76 |
| 2005/0275892 A1 * | 12/2005 | Obata et al. | ...................... | 358/1.16 |
| 2006/0008306 A1 * | 1/2006 | Hisatomi | ........................ | 400/76 |
| 2006/0087945 A1 * | 4/2006 | Hwang et al. | .............. | 369/53.17 |
| 2006/0152762 A1 | 7/2006 | Asano et al. | | |
| 2006/0215876 A1 * | 9/2006 | Sugahara et al. | ............. | 382/100 |
| 2010/0223423 A1 * | 9/2010 | Sinclair et al. | ................ | 711/103 |

FOREIGN PATENT DOCUMENTS

| | | |
|---|---|---|
| JP | 9-223061 | 8/1997 |
| JP | 9-284572 | 10/1997 |
| JP | 2003-030801 | 1/2003 |
| JP | 2004-005586 | 1/2004 |
| JP | 2004-157758 | 6/2004 |
| JP | 2004-288049 | 10/2004 |
| JP | 2004-343157 | 12/2004 |
| JP | 2005-203066 | 7/2005 |
| JP | 2006-059025 | 3/2006 |
| JP | 2006-157665 | 6/2006 |
| JP | 2006-197234 | 7/2006 |

* cited by examiner

Primary Examiner — Satwant Singh
(74) Attorney, Agent, or Firm — Dickstein Shapiro LLP (57) ABSTRACT An electronic device includes a storage unit that stores therein input data, and a deleting unit that partially deletes the input data when the input data becomes unnecessary. The deleting unit deletes portions of the input data, each having a predetermined size, with predetermined or random spacing between the portions in row and column directions, or deletes only an effective portion of the input data.

13 Claims, 9 Drawing Sheets

ELECTRONIC DEVICE

CROSS-REFERENCE TO RELATED APPLICATIONS

The present application claims priority to and incorporates by reference the entire contents of Japanese priority document, 2006-199763 filed in Japan on Jul. 21, 2006.

BACKGROUND OF THE INVENTION

1. Field of the Invention

The present invention relates to a technology for deleting data from a storage device.

2. Description of the Related Art

Image forming devices are often incorporated with a large-capacity storage device such as a hard disk drive (HDD). Such a storage device is used to temporarily store image data when, for example, a plurality of copies are produced from an image or duplex printing of an image is performed. The storage device is also used to store image data read by a scanner until the image data is downloaded to another electronic device via a network.

In recent years, with an increase in information crimes associated with networking as a background, there has been a growing trend to reinforce corporate information-security management, and authentication systems, such as Information Security Management System (ISMS), has started. In consideration of the risk of information leakage by extraction of a hard disk, in total corporate information-security management, data left in the large-capacity storage device incorporated in the image forming device poses problems that cannot be neglected.

To cope with such problems, Japanese Patent Application Laid-Open No. 9-223061 discloses a conventional technology in which a classified document mode can be set at a copier. When this mode is set, image data on a hard disk is deleted upon completion of the process of the image data.

Japanese Patent Application Laid-Open No. 2004-343157 discloses a conventional technology in which an area for overwrite-delete is checked to see whether to overwrite that area and, when it is determined to overwrite, overwrite-delete is performed.

However, in an overwrite-deletion process, resources, such as a central processing unit (CPU), are used for that process, and an access to storage medium is frequently repeated, which delays input/output processing speed.

To efficiently perform both overwriting process and input/output process, Japanese Patent Application Laid-Open No. 2004-288049 discloses a conventional technology in which a deletion process is started when a predetermined condition is satisfied. Japanese Patent Application Laid-Open No. 9-284572 discloses a conventional technology in which deletion process is started when the image forming device enters in idle state. With this, an overlap between an input/output process and a deletion process is avoided, thereby achieving efficiency in processing.

However, in the conventional technologies disclosed in Japanese Patent Application Laid-Open Nos. 2004-288049 and 9-284572, timing of overwrite-delete and a data input/output path are changed, and a process load in the overwrite process itself is still large for the efficiency in processing of the overwrite-delete. Moreover, the overwrite-delete still has a large influence on the input/output process of the image forming device. Furthermore, if security of the remaining data in a storage device is emphasized, sequential deletion is required in which the remaining data is immediately deleted when not required. With sequential deletion, there is a problem in which an overlap with the input/output process cannot be avoided.

SUMMARY OF THE INVENTION

It is an object of the present invention to at least partially solve the problems in the conventional technology.

According to an aspect of the present invention, an electronic device includes a storage unit that stores therein input data, and a deleting unit that performs deletion process when the input data becomes unnecessary. In the deletion process, the deleting unit deletes portions of the input data, each having a predetermined size, with a predetermined spacing between the portions in row and column directions.

According to another aspect of the present invention, an electronic device includes a storage unit that stores therein input data, and a deleting unit that performs deletion process when the input data becomes unnecessary. In the deletion process, the deleting unit deletes portions of the input data, each having a predetermined size, with random spacing between the portions in row and column directions.

According to still another aspect of the present invention, an electronic device includes a storage unit that stores therein input data, a specifying unit that specifies, when the input data becomes unnecessary, an effective portion of the input data, and a deleting unit that performs deletion process to delete the effective portion of the input data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the following description, a digital multifunction product (MFP) with a plurality of functions, such as image forming including copying, scanning, printing, and faxing is used as an en electronic device.

Figure 1:
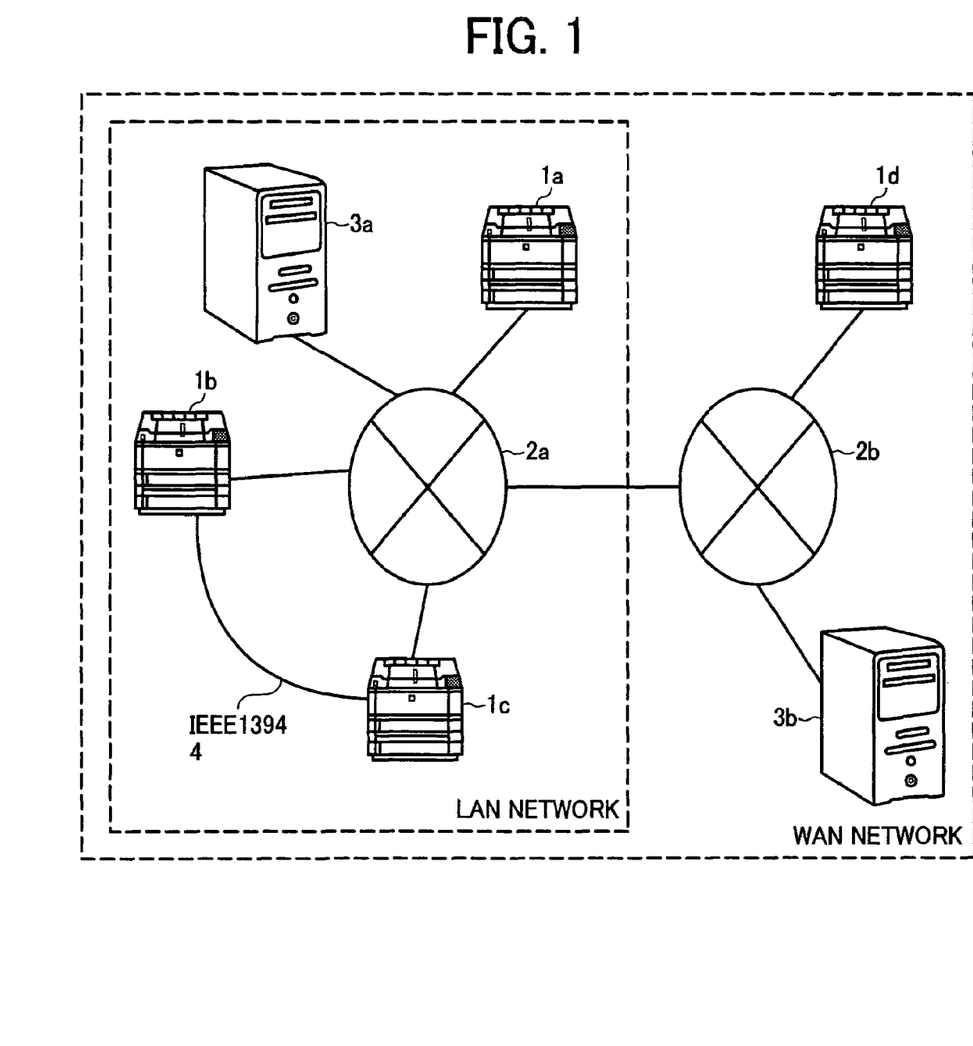
FIG. 1 is an example of a network environment including an electronic device according to an embodiment of the present invention.

FIG. 1 is an example of a network environment according to an embodiment of the present invention.

A plurality of MFPs 1 (1a, 1b, 1c, and 1d) are connected to a plurality of servers 3 (3a and 3b) and external devices or other electronic devices (not shown), such as personal computers (PCs), in network environments, such as local area networks (LAN) 2 (2a and 2b) and a wide area network (WAN) connecting the LANs 2, thereby allowing each device to intercommunicate with each other.

A communication line 4 is a communication line complying with Institute of Electrical and Electronics Engineers (IEEE) 1394 individually connecting the MFPs 1.

The MFP 1 is an electronic device that includes a storage unit such as semiconductor memory or HDD, an image data managing unit, and a deleting unit. The storage unit stores therein image data read by a scanner (image reading unit) i.e., image data obtained by converting an image signal from an optical-electrical converting element, such as a charge-coupled device (CCD) solid imaging element, to a digital signal, image data input from a network interface (digital image input unit), or other input data. The image data managing unit manages the position, size (amount), contents (such as format), deletion state of the image data stored in the storage unit. The deleting unit deletes the image data using various conditions and deletion schemes when the image data stored in the storage unit becomes unnecessary.

The server 3 is a high-performance information processing device.

Figure 2:
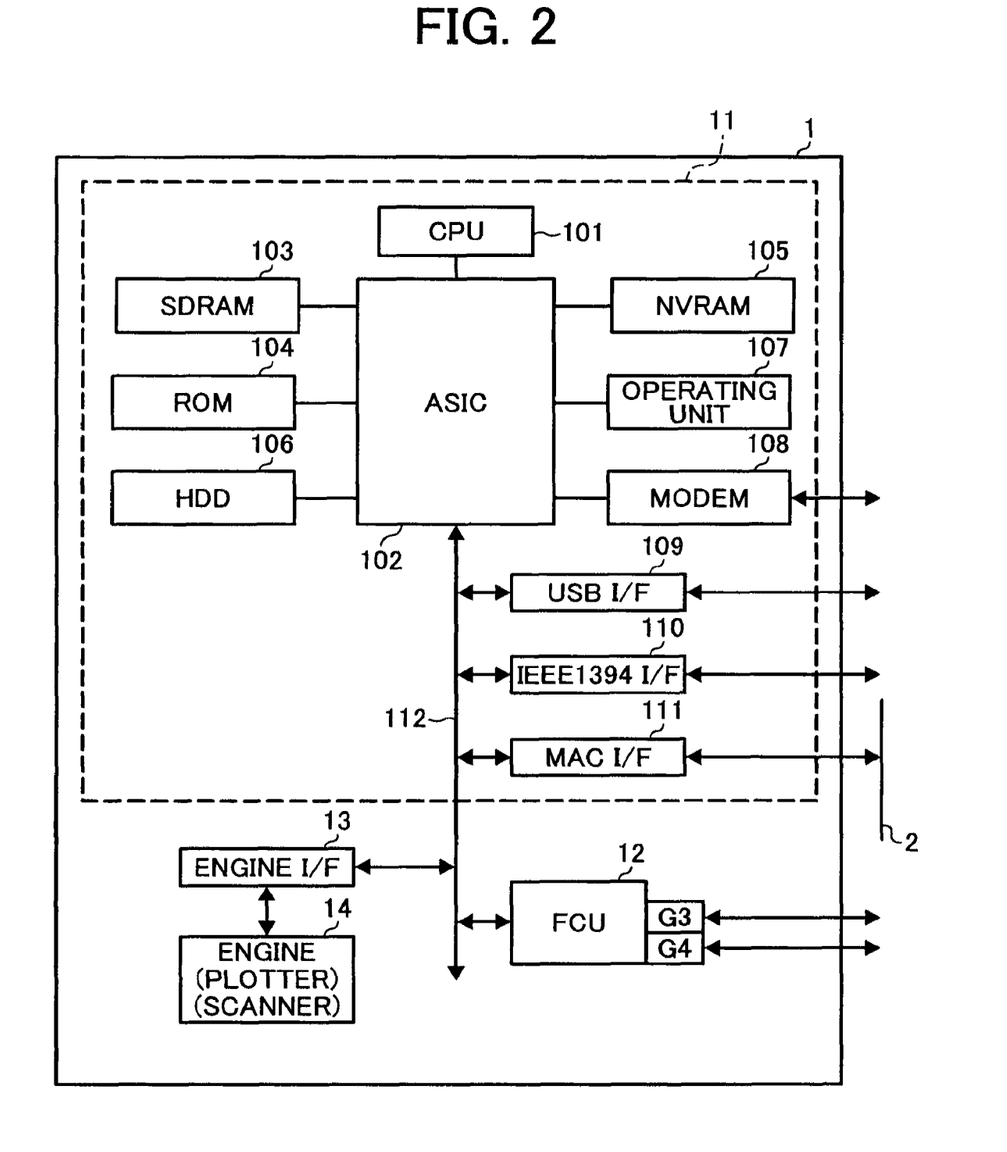
FIG. 2 is a block diagram of a hardware configuration of a multifunction product (MFP) shown in FIG. 1.

FIG. 2 is a block diagram of a hardware configuration of the MFP 1.

The MFP 1 is an image forming device that functions as, for example, a digital copier, a printer, a facsimile machine, and a scanner. In other words, The MFP 1 has various functions including a copy function, a document-box function, a scanner function, a printer function, and a facsimile function. As shown in FIG. 2, the MFP 1 includes a controller 11, a facsimile control unit (FCU) 12, an engine interface (I/F) 13, an engine 14, and other components. Such components are hardware resources for image processing, such as data reading, printing (image formation), and data transmission.

The controller 11 has overall control of each component of the MFP 1 to implement various functions.

The FCU 12 controls communication with external devices, for example, image forming devices, such as a facsimile machine, a digital copier having a modem function (facsimile communication function), and other MFP (digital MFP), via public lines.

The engine I/F 13 is an interface for connecting the engine 14 to a Peripheral Component Interconnect (PCI) bus.

The engine 14 is equivalent to a hardware device such as a scanner that reads an image (image reading unit), a plotter (image forming unit) that prints image data read by the scanner or print data received from an external device on a sheet (or another recording medium) as a visible image, an automatic document feeder (ADF) that automatically feeds a document to an image reading position of the scanner, or a post-processing device that performs post-processing, such as sorting, stacking, and stapling, on the sheet printed by the plotter. Here, if print data received from an external device, such as a PC (not shown), is character code or rendering data instead of image data for printing, such print data is converted by the controller 11 to image data for printing.

The controller 11 includes a CPU 101, an Application Specific Integrated Circuit (ASIC) 102, a Synchronous Dynamic Random Access Memory (SDRAM) 103, a Read-Only Memory (ROM) 104, a Non-volatile Random Access Memory (NVRAM) 105, an HDD 106, an operating unit 107, a modem 108, a Universal Serial Bus (USB) I/F 109, an Institute of Electrical and Electronic Engineers (IEEE) 1394 I/F 110, and a Media Access Controller (MAC) I/F 111. In practice, the operating unit 107 is arranged outside the controller 11.

The CPU 101 is an arithmetic-operation processing unit that performs data processing (control over each function) via the ASIC 102.

The ASIC 102 is a multifunctional device board including a CPU interface, an SDRAM interface, a local-bus interface, a PCI interface, and an HDD interface to share devices to be controlled by the CPU 101 and make development of applications and the like more efficient in view of architecture.

The ASIC 102 has directly connected thereto the operating unit 107 that receives operation instructions and the like from the engine and also has directly connected thereto the modem 108. Furthermore, the ASIC 102 has connected thereto the USB I/F 109, the IEEE 1394 I/F 110, the MAC I/F 111, the FCU 12, and the engine I/F 13 via a PCI bus 112.

The SDRAM 103 is a main semiconductor memory for use as a program memory that stores therein various computer programs, a work memory used by the CPU 101 to perform data processing, an image memory that stores image data, and the like.

In place of this SDRAM 103, a Dynamic Random Access Memory (DRAM) or a Static Random Access Memory (SRAM) can be used.

The ROM 104 stores therein computer programs to be executed by the CPU 101 and fixed data. The ROM 104 can store therein various applications (application programs).

The NVRAM 105 stores therein an image data management table (image data managing unit) for managing the position, size, contents, and deletion state of the image data stored in the HDD 106 and data, such as various variable parameters, and can retain the stored contents even when power is turned off. Examples of the NVRAM 105 include a non-volatile RAM having integrated therein a backup circuit using a RAM and a battery, an electrically erasable programmable ROM (EEPROM), and a flash memory.

The HDD 106 is a large-capacity storage device (storage unit) that stores therein various data including an Operating System (OS) and various applications for achieving various services irrespectively of on and off of power. The data in the SDRAM 103 and the data in the NVRAM 105 can be stored in the HDD 106.

When the MFP 1 is turned on, according to a boot loader (boot program) in the ROM 104, the CPU 101 loads the OS from the HDD 106 into the SDRAM 103, and starts the OS. The CPU 101 also loads the other data, such as an application in the HDD 106, into the SDRAM 103 as required. The CPU 101 executes the computer programs stored in the SDRAM 103 as required and controls the units of the MFP 1 including the operating unit 107. Thus, the functions of the embodiment (functions as a deleting unit, a setting unit, a determining unit, a detecting unit, a specifying unit, an overwrite-target determining unit, an overwriting unit, a data-position detecting unit, a head-position detecting unit, and a deletion-target determining unit) can be implemented.

The operating unit 107 includes various operation keys or buttons for inputting data, such as operation instruction, to the engine 14 and a display, such as liquid crystal display (LCD) or a cathode-ray tube (CRT). The display includes a touch panel on its surface. The touch panel displays keys corresponding to various functions. Touch (press) of each key issues a command for a corresponding operation.

The modem 108 is a modulating/demodulating unit that modulates data to be transmitted to an external device (not shown) via a public line to a format allowing transmission through the public line, and demodulates received modulated data sent from an external device.

The USB I/F 109 and the IEEE 1394 I/F are interfaces (direct interfaces) complying with USB and IEEE 1394 standards, respectively, for directly connecting to an external device (peripheral device) for communication.

The MAC I/F 111 is a network interface for communication with each of external devices, such as another MFP 1, via the LAN 2.

Note that direct interfaces other than the USB I/F 109 and the IEEE 1394 I/F 110 can be additionally provided to the controller 11.

With the copy function, a scanner reads an image, and the image data is sent to a plotter for printing on a sheet as a visible image. The copy function is implemented by a copy application.

With the scanner function, a scanner reads an image, and the image data is transmitted (distributed) to a previously-set external device via electronic mail or the like. The scanner function is implemented by a scanner application.

With the printer function, print data from the server 3 or a PC is directly sent or converted and then sent to a plotter for printing on a sheet as a visible image. The printer function is implemented by a printer application.

With the facsimile function, a scanner reads an image, and the image data is transmitted via facsimile by the FCU 12 to a previously-set external device. Similarly, image data already stored in the HDD 106 (or another memory) is transmitted via facsimile by the FCU 12 to a previously-set external device. Besides, image data received via facsimile transmission from an external device is stored in the HDD 106 or sent to a plotter for printing on a sheet as a visible image. The facsimile function is implemented by a facsimile application.

With the document-box function, a scanner reads an image, and the image data is stored in the HDD 106, or image data already stored in a memory is read and sent to a plotter for printing on a sheet as a visible image.

Figure 3:
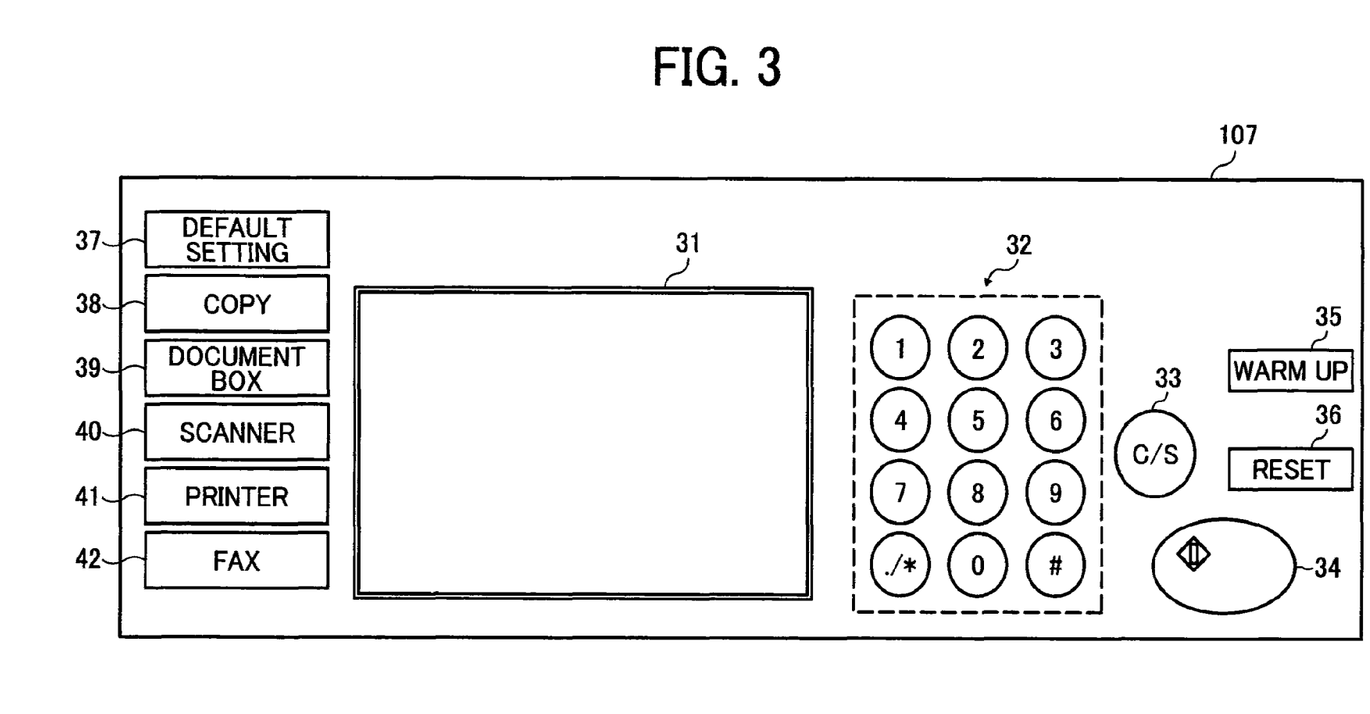
FIG. 3 is an example of an operating unit shown in FIG. 2.

FIG. 3 is an example of the operating unit 107.

This operating unit 107 includes a liquid-crystal touch panel 31, a numeric keypad 32, a CLEAR/STOP key 33, a start key 34, a WARM UP key 35, a RESET key 36, a DEFAULT SETTING key 37, a COPY key 38, a DOCUMENT BOX key 39, a SCANNER key 40, a PRINTER key 41, and a FAX key 42.

On the touch panel 31, various function keys, the number of set sheets, a message indicative of a state of the digital MFP, and the like are displayed.

By pressing the DEFAULT SETTING key 37, the initial state of the MFP 1 can be arbitrarily customized. For example, the size of sheets (transfer sheets) accommodated in the device can be set, and a state set when a mode clear key of the copy function is pressed can be arbitrarily set. Also, an application or the like selected with priority when no operation is present for a predetermined period can be selected, a time for transition to a low-power state according to International Energy Star Plan can be set, and also a time for transition to auto-off/sleep mode can be set.

When the WARM UP key 35 is pressed, the MFP 1 enters energy-saving mode (warm-up mode) from wait mode. Accordingly, fixing temperature decreases, and a light of the display of the operating unit 107 turns off. The warm-up mode indicates low-power state in International Energy Star Plan. When the warm-up or off/sleep mode is released to wait mode, the WARM UP key is again pressed.

The numeric keypad 32 includes keys for inputting numerical values indicating the number of sheets for printing (copy) and scaling. The CLEAR/STOP key 33 is a key for clearing the number of sheets placed (the number of sheets for printing) or stopping the operation being performed.

The COPY key 38, the DOCUMENT BOX key 39, the SCANNER key 40, the PRINTER key 41, and the FAX key 42 are pressed to use the copy function, the document-box function, the scanner function, the printer function, and the facsimile function (facsimile transmission).

Specific examples of the operation of the MFP 1 are explained below with reference to FIGS. 4 to 8.

Prior to explanation of the examples, for convenience of understanding, a conventional overwrite-deletion process is explained with reference to FIG. 9.

Figure 9:
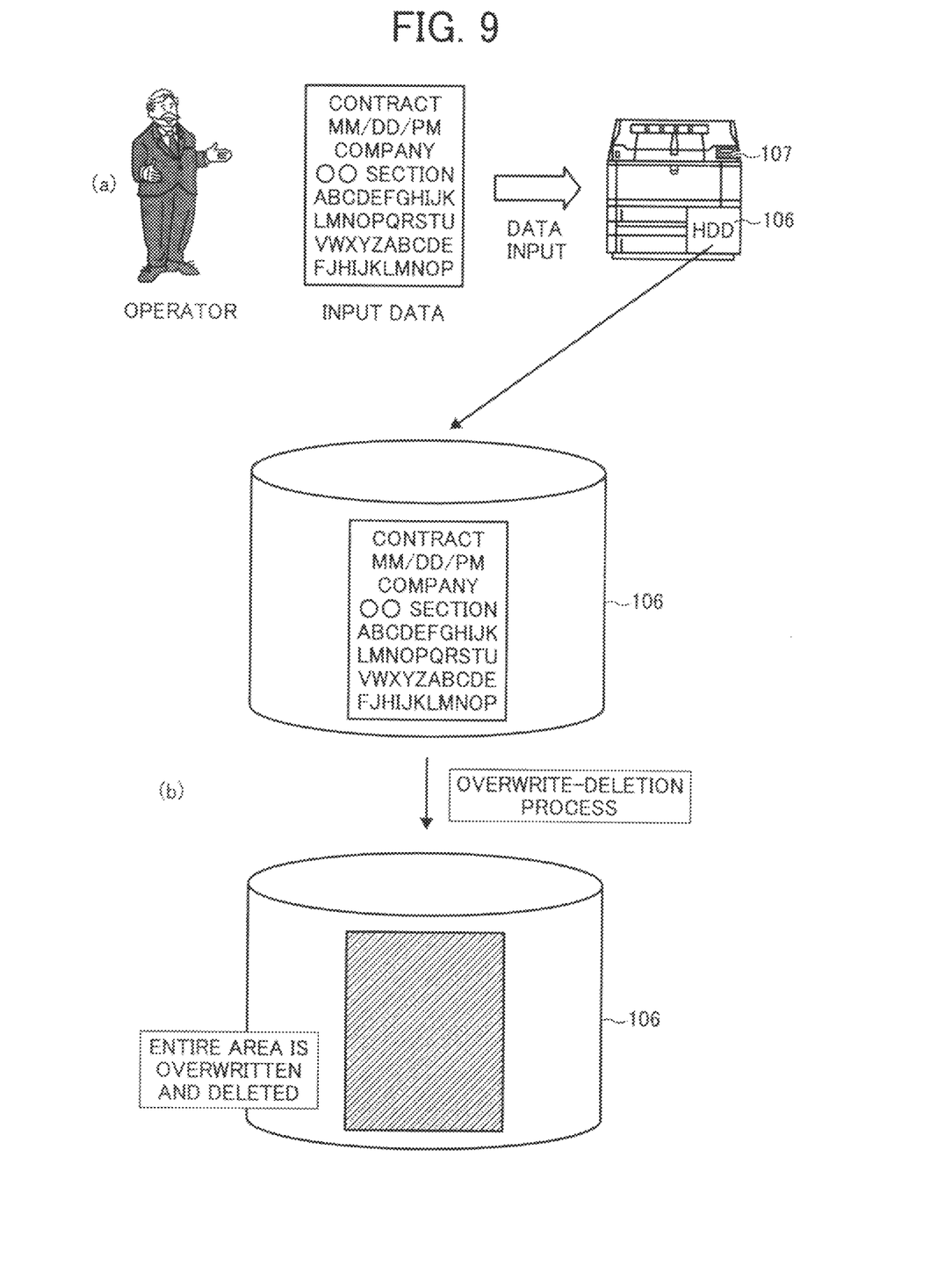
FIG. 9 is a schematic diagram for explaining an example of a conventional overwrite-deletion process.

FIG. 9 is a schematic diagram for explaining an example of a conventional overwrite-deletion process. Like reference numerals refer to portions corresponding to those shown in FIGS. 1 and 2.

As shown in (a) of FIG. 9, the CPU 101 stores image data received through an operation signal (input or a command provided by a user) in the HDD 106. The image data is, for example, fed in response to a print command provided through the PC, or read by the scanner in response to a copy command provided through the operating unit 107.

When the image data becomes unnecessary after printing of the image data by the plotter or the like, the entire area of the unnecessary image data in the HDD 106 is overwritten and deleted, as indicated by a hatched portion in (b) of FIG. 9, automatically or in response to an operation signal (delete command) provided through the PC or the operating unit 107.

In such a conventional overwrite-deletion process, the entire area of the unnecessary image data is overwritten and deleted by the CPU 101. Thus, an access to the HDD 106 is frequently repeated, which decreases input/output processing speed.

In the examples explained below, to solve this problem, when image data becomes unnecessary, a determination is made as to a manner in which an overwrite-deletion process is performed on the unnecessary image data in the HDD 106. Then, an overwrite-deletion process is performed in the manner determined.

Figure 4:
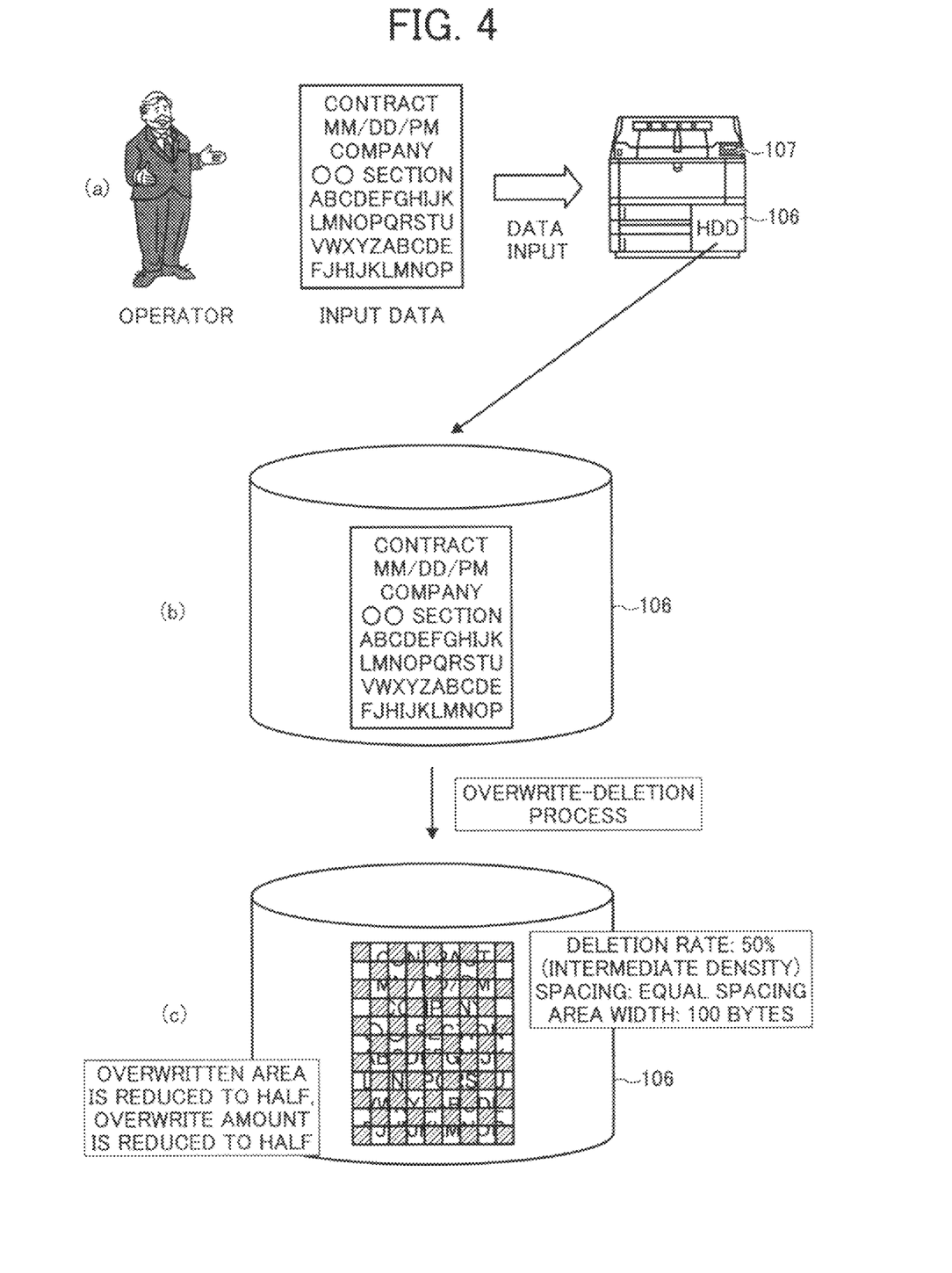
FIGS. 4 to 8 are schematic diagrams for explaining examples of the operation of the MFP.

FIG. 4 is a schematic diagram for explaining a first example of the operation of the MFP 1.

As shown in (a) of FIG. 4, the CPU 101 stores image data received through an operation signal (command) in the HDD 106. The image data is, for example, fed in response to a print command provided through the PC, or read by the scanner in response to a copy command provided through the operating unit 107.

As shown in (b) of FIG. 4, when the image data becomes unnecessary after printing of the image data by the plotter or the like, a determination is made as to a manner in which an overwrite-deletion process is performed on the unnecessary image data in the HDD 106 (including an area to be deleted) according to an operation signal (designation of how the image data is to be deleted) provided by a user through the PC or the operating unit 107. The overwrite-deletion process is performed in the designated manner.

In the first example, as shown in (c) of FIG. 4, data deletion (represented by a hatched portion) and data-delete skip (no data deletion) of a predetermined area of the unnecessary image data are alternately performed. That is, deletion of data in a predetermined area is repeated with a predetermined spacing in row and column directions.

The overwrite-deleted image data as shown in (c) of FIG. 4 is obtained when deletion rate is set to 50% (intermediate density), spacing (predetermined spacing) is set to equal spacing, and area width (predetermined area) is set to 100 bytes.

These parameters are set according to an operation signal provided through the PC or the operating unit 107.

When random spacing is specified, deletion of data in the predetermined area of the unnecessary image data can be repeated with random spacing in row and column directions.

According to the first example, data is deleted in a skipped manner, and data in skipped areas remain undeleted. However, even such partial deletion can prevent information leakage. Also, the total amount of deleted data is reduced, which reduces the load on the CPU to perform the deletion process. Thus, even when an overwrite-deletion process and another process, such as an input/output process are performed simultaneously, the overwrite-deletion process can be smoothly performed without impairing security. Besides, spacing for data deletion can be variably set by a user, and the versatility is increased.

Incidentally, input data, such as image data, varies in importance according to the purpose of the user, and also varies in contents and details.

Figure 5:
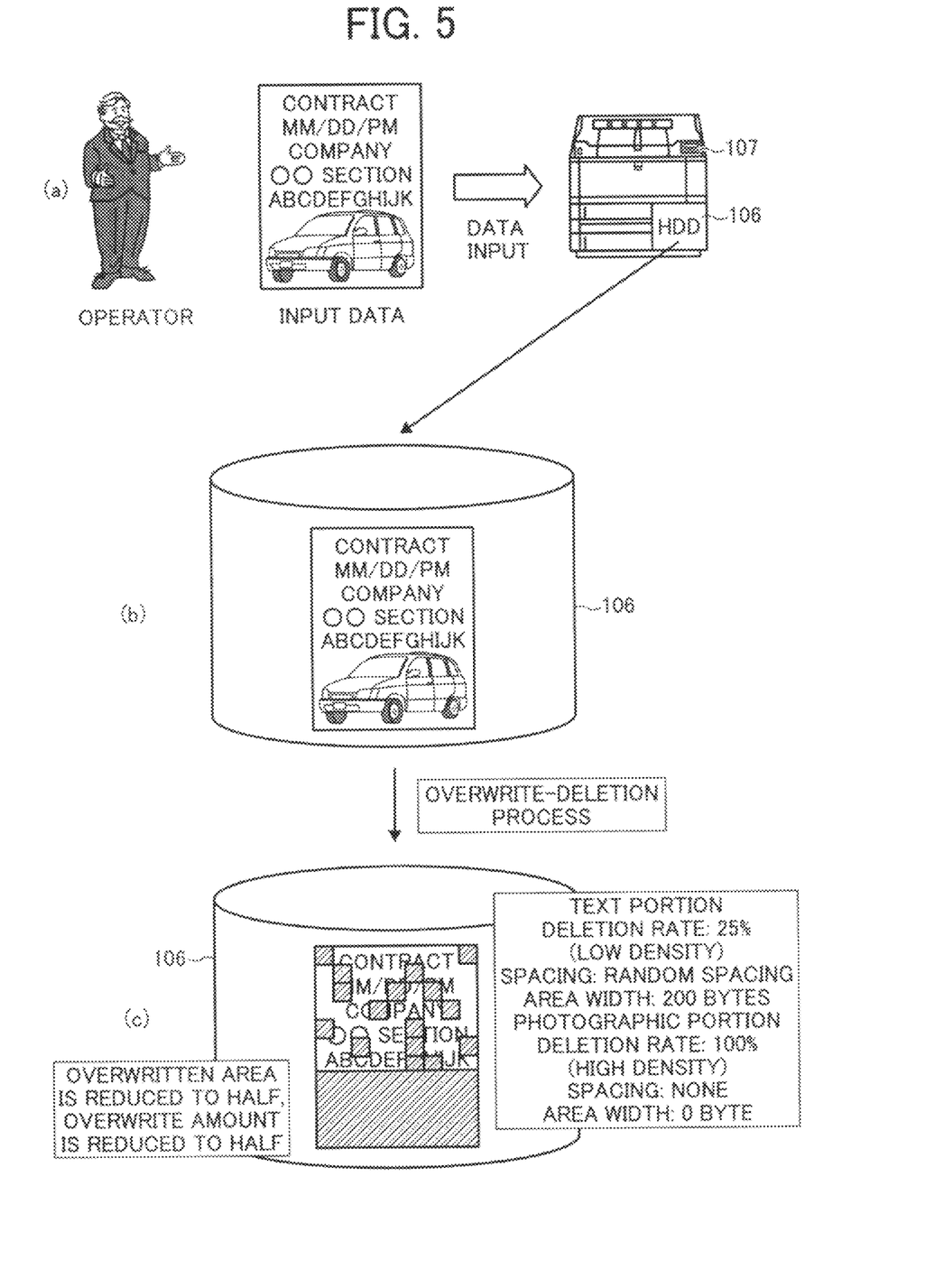

FIG. 5 is a schematic diagram for explaining a second example of the operation of the MFP 1.

As shown in (a) of FIG. 5, the CPU 101 stores, in the HDD 106, image data received in such a manner as previously described in connection with (a) of FIG. 4.

As shown in (b) of FIG. 5, when the image data becomes unnecessary after printing of the image data by the plotter or the like, a determination is automatically made as to a manner in which an overwrite-deletion process is performed on the unnecessary image data in the HDD 106 according to the contents (or size) of the image data. The overwrite-deletion process is performed in the manner thus determined.

In the second example, as shown in (c) of FIG. 5, data deletion (represented by a hatched portion) and data-delete skip of a predetermined area of the unnecessary input data are alternately performed. That is, deletion of data in a predetermined area is repeated with random spacing (or predetermined spacing) in row and column directions. Also, the entire area of a photographic portion (a picture of an automobile) in the image data is overwritten and deleted.

The overwrite-deleted image data as shown in (c) of FIG. 5 is obtained when deletion rate is set to 25% (low density), spacing is set to random spacing, and area width is set to 200 bytes for a text portion, and deletion rate is set to 100% (high density) for the photographic portion.

These parameters can be set as follows:
(1) The contents (format) of unnecessary image data are determined with reference to the image data management table, and parameters are automatically set based on the determination result
(2) The size of unnecessary image data is checked with reference to the image data management table, and parameters are automatically set based on the determination result According to the second example, effects similar to those in the first example can be achieved.

Besides, spacing for data deletion can be variably set based on the contents or size of unnecessary image data. Thus, an overwrite-deletion process is performed such that a character part and a text part are roughly deleted with emphasis on the deletion speed, and a photographic portion and portions such as table and diagram are deleted at a high deletion rate with emphasis on prevention of information leakage. With this, the process can be effectively and efficiently performed.

Figure 6:
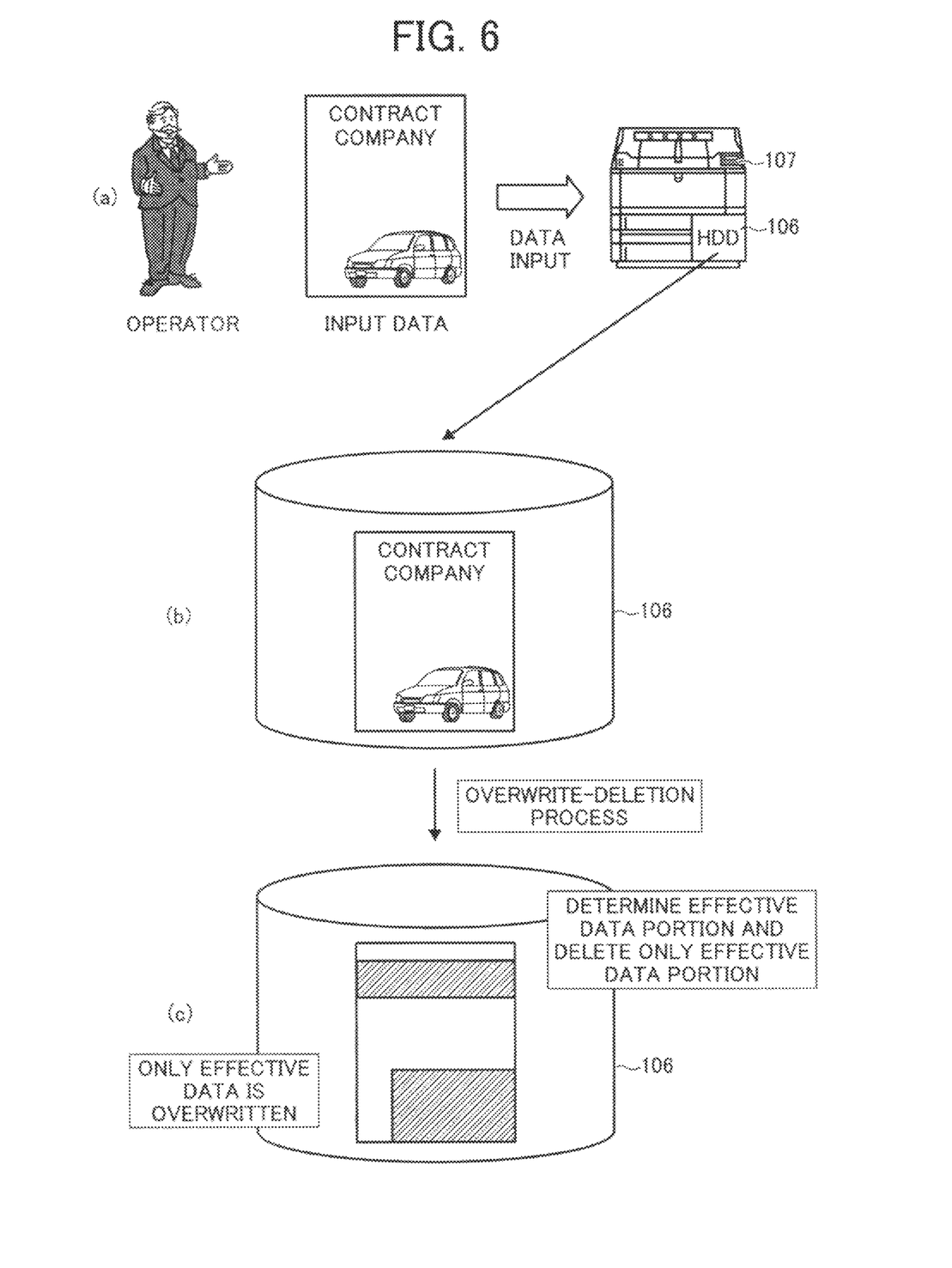

FIG. 6 is a schematic diagram for explaining a third example of the operation of the MFP 1.

As shown in (a) of FIG. 6, the CPU 101 stores, in the HDD 106, image data received in such a manner as previously described in connection with (a) of FIG. 4.

As shown in (b) of FIG. 6, when the image data becomes unnecessary after printing of the image data by the plotter or the like, a determination is automatically made as to a manner in which an overwrite-deletion process is performed on the unnecessary image data in the HDD 106 according to the contents (or size) of the image data. The overwrite-deletion process is performed in the manner thus determined.

In the third example, as shown in (c) of FIG. 6, an effective data portion (represented by a hatched portion) in the unnecessary image data is determined, and only the effective data portion is overwritten and deleted. Portions other than the effective data portion are not subjected to overwrite-deletion.

According to the third example, effects similar to those in the first example can be achieved.

Figure 7:
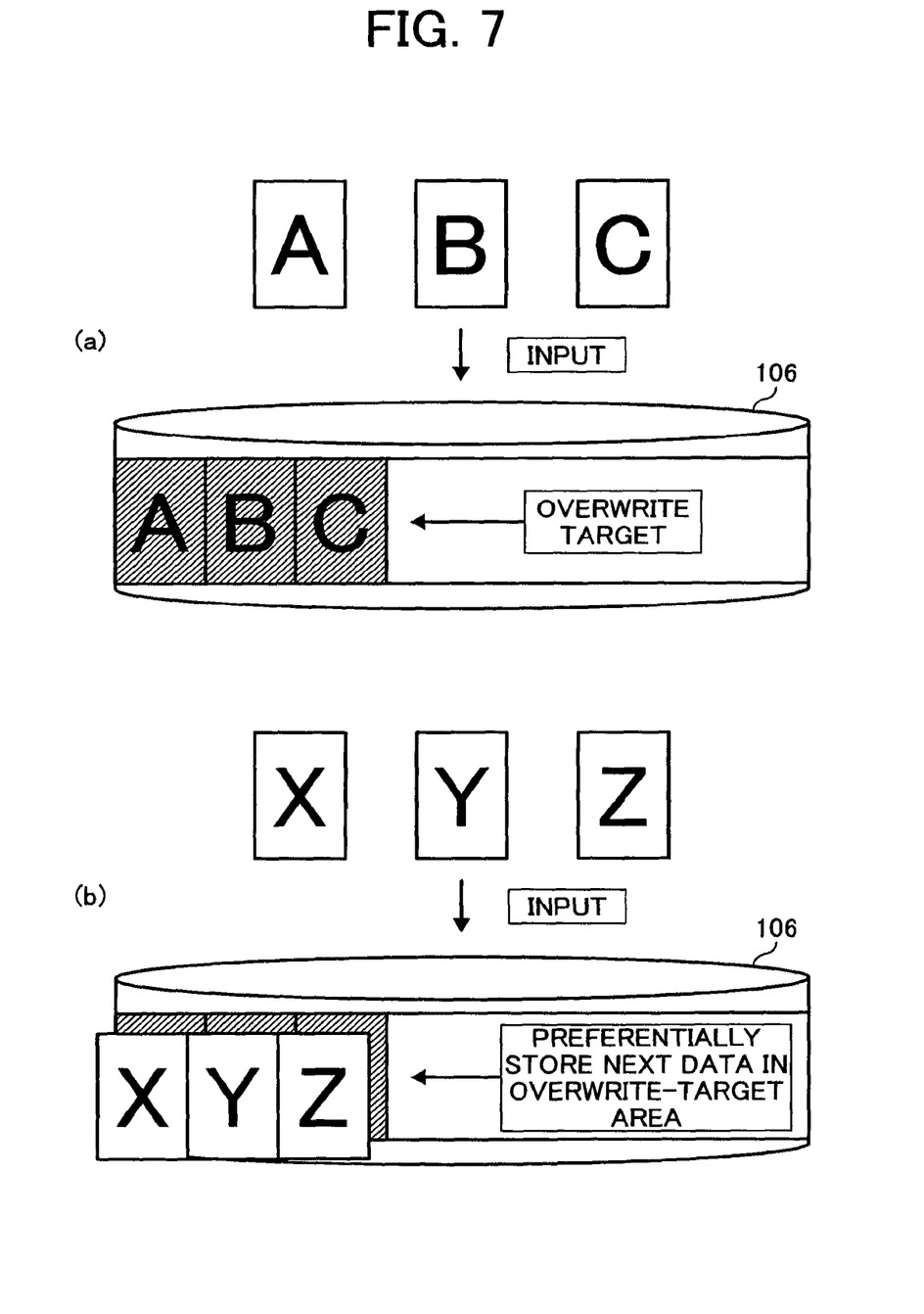

FIG. 7 is a schematic diagram for explaining a fourth example of the operation of the MFP 1.

The CPU 101 performs the following process in addition to the process previously described in the first to third examples.

As shown in (a) of FIG. 7, when image data input from a scanner or the like and stored in the HDD 106 becomes unnecessary, the image data is to be overwritten.

As shown in (b) of FIG. 7, when the next image data is input to the HDD 106 where the unnecessary image data is stored, the unnecessary image data is determined as an overwrite target.

Then, an area where the overwrite target is stored (overwrite-target area) is preferentially overwritten with the next image data. The overwrite target is not required to be deleted.

According to the fourth example, in addition to effects similar to those in any one of the first to third examples, the following effect can be achieved. That is, unnecessary image data is overwritten with new data and is not deleted. Thus, even when an overwrite-deletion process and an input/output process are simultaneously performed, the processing speed can be increased by a time required for deletion process.

Figure 8:
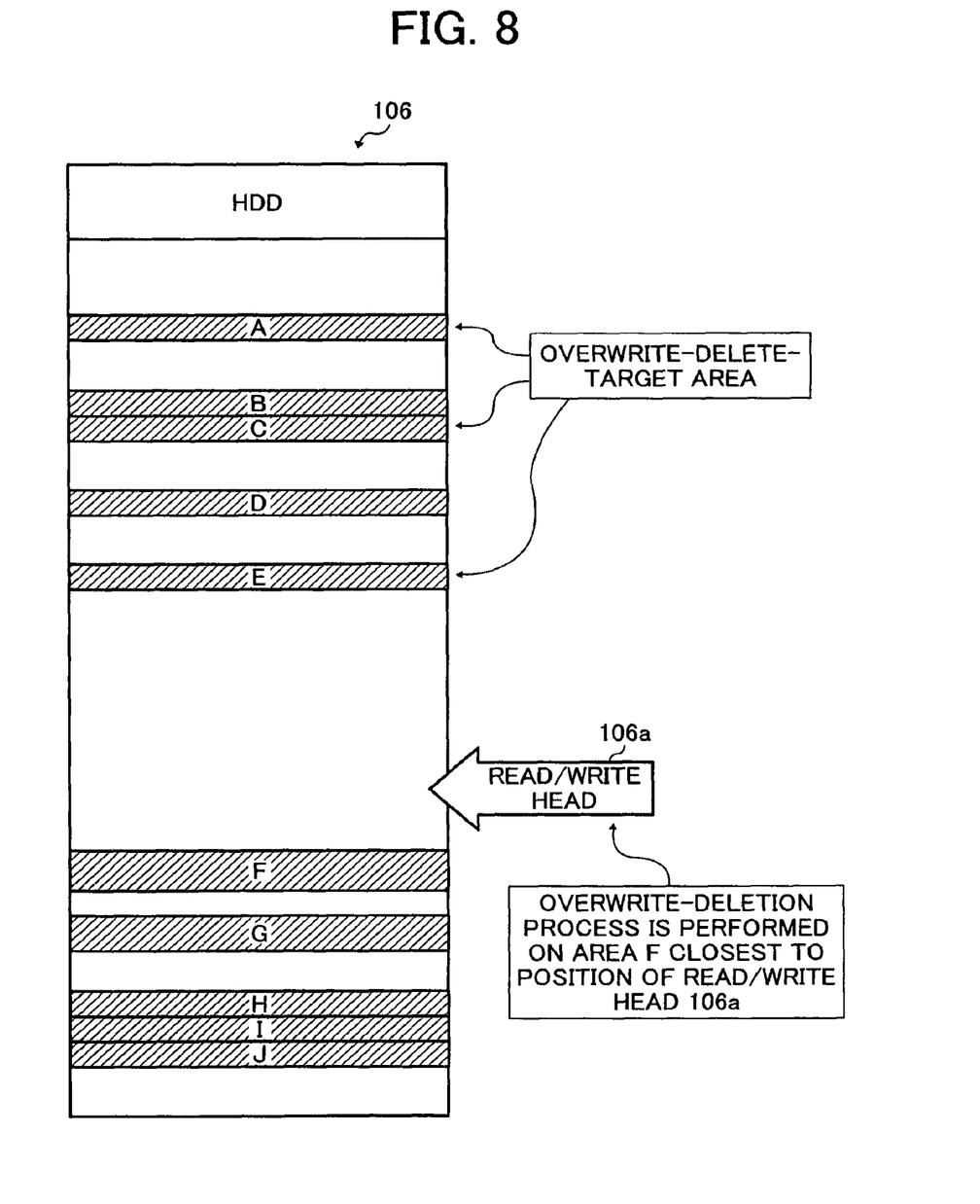

FIG. 8 is a schematic diagram for explaining the fifth example of the operation of the MFP 1.

The CPU 101 performs the following process when performing the process previously described in the first to third examples.

When a plurality of pieces of unnecessary image data (overwrite-delete-target areas) are present in the HDD 106, generally, these pieces of image data are deleted in the order in which they were input (written) to the HDD 106. However, as shown in FIG. 8, when overwrite-delete-target areas are scattered, searching for the next overwrite-delete-target area and then moving a read/write head 106a to that area is inefficient, and causes a delay in overwrite-deletion process.

To get around this problem, the position of the read/write head 106a is monitored (detected), and the position is compared with overwrite-delete-target areas. Based on the comparison, an overwrite-delete-target area closest to the read/write head 106a at that time is determined as an overwrite-delete target, whereby an overwrite-deletion process is performed on that deletion-target area.

With this, the moving time of the read/write head 106a and seek time (search time) can be reduced. Thus, less time is required to perform an overwrite-deletion process.

As set forth hereinabove, according to an embodiment of the present invention, even if performed with another process, such as an input/output process, a deletion process can be smoothly performed without impairing security.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
a storage unit that stores therein input data, and that includes a read-and-write head that reads and writes data;
a deleting unit that performs deletion process, when the input data becomes unnecessary, to delete portions of the input data;
a data-position detecting unit that detects, when the storage unit stores therein a plurality of pieces of input data that has become unnecessary, a position of the pieces of input data;
a head-position detecting unit that detects a position of the read-and-write head; and
a deletion-target determining unit that determines one of the pieces of input data as a target to be subjected to the deletion process based on the position of the pieces of input data and the position of the read-and-write head,
wherein the deleting unit performs the deletion process on the target.

2. The electronic device according to claim 1, further comprising a setting unit that sets a deletion spacing according to an operation signal received from outside.

3. The electronic device according to claim 1, further comprising: a determining unit that determines content of the input data; and a setting unit that sets a deletion spacing based on the content of the input data.

4. The electronic device according to claim 1, further comprising: a detecting unit that detects a size of the input data; and a setting unit that sets a deletion spacing based on the size of the input data.

5. The electronic device according to claim 1, further comprising: an overwrite-target determining unit that determines the input data that has become unnecessary as a target to be overwritten when new data is to be stored in the storage unit; and an overwriting unit that overwrites an area on the storage unit where the target is stored with the new data.

6. The electronic device according to claim 1, wherein the portions are deleted with a predetermined spacing between the portions in row and column directions, the portions having a predetermined size.

7. An electronic device comprising:
a storage unit that stores therein input data, and that includes a read-and-write head that reads and writes data;
a deleting unit that performs deletion process, to delete portions of the input data with random spacing between the portions in row and column directions, the portions having a predetermined size;
a data-position detecting unit that detects, when the storage unit stores therein a plurality of pieces of input data that has become unnecessary, a position of the pieces of input data;
a head-position detecting unit that detects a position of the read-and-write head; and
a deletion-target determining unit that determines one of the pieces of input data as a target to be subjected to the deletion process based on the position of the pieces of input data and the position of the read-and-write head,
wherein the deleting unit performs the deletion process on the target.

8. The electronic device according to claim 7, further comprising a setting unit that sets the spacing according to an operation signal received from outside.

9. The electronic device according to claim 7, further comprising: a determining unit that determines content of the input data; and a setting unit that sets the spacing based on the content of the input data.

10. The electronic device according to claim 7, further comprising: a detecting unit that detects a size of the input data; and a setting unit that sets the spacing based on the size of the input data.

11. The electronic device according to claim 7, further comprising: an overwrite-target determining unit that determines the input data that has become unnecessary as a target to be overwritten when new data is to be stored in the storage unit; and an overwriting unit that overwrites an area on the storage unit where the target is stored with the new data.

12. An electronic device comprising:
a storage unit that stores therein input data, and that includes a read-and-write head that reads and writes data;
a specifying unit that specifies, an effective portion of the input data;
a deleting unit that performs deletion process to delete the effective portion of the input data;
a data-position detecting unit that detects, when the storage unit stores therein a plurality of pieces of input data that has become unnecessary, a position of the pieces of input data;
a head-position detecting unit that detects a position of the read-and-write head; and
a deletion-target determining unit that determines one of the pieces of input data as a target to be subjected to the deletion process based on the position of the pieces of input data and the position of the read-and-write head,
wherein the deleting unit performs the deletion process on the target.

13. The electronic device according to claim 12, further comprising: an overwrite-target determining unit that determines the input data that has become unnecessary as a target to be overwritten when new data is to be stored in the storage unit; and an overwriting unit that overwrites an area on the storage unit where the target is stored with the new data.

* * * * *